United States Patent [19]

Shimon

[11] Patent Number: 4,549,743
[45] Date of Patent: Oct. 29, 1985

[54] HAY BALE CARRIER

[76] Inventor: Dale H. Shimon, P.O. Box 100, Esparto, Calif. 95627

[21] Appl. No.: 561,235

[22] Filed: Dec. 14, 1983

[51] Int. Cl.⁴ .............................................. B62B 1/14
[52] U.S. Cl. .................................. 280/47.13 R; 280/63
[58] Field of Search ............ 280/47.1, 47.13 R, 47.17, 280/47.3, 47.24, 63; 414/457

[56] References Cited

U.S. PATENT DOCUMENTS

| | | | |
|---|---|---|---|
| 283,290 | 8/1882 | Simpson | 280/63 |
| 3,913,762 | 10/1975 | Alexander | 280/47.24 |
| 4,174,849 | 11/1979 | Wetzel | 280/47.3 |

Primary Examiner—David M. Mitchell
Assistant Examiner—Richard Camby
Attorney, Agent, or Firm—Brady, O'Boyle & Gates

[57] ABSTRACT

A hay bale carrier of simplified construction, and increased efficiency and convenience of use, is disclosed. A wheeled axle carries a rod framework which defines a planar support surface for a hay bale. A transverse frame rod parallel to the wheel axle and disposed near the planar surface engages beneath two outside bale wires while a center bale wire is stretched into engagement with a retaining element on the framework near the center thereof. In instances where the two outer bale wires are sufficiently loose, they are stretched into engagement with two other retaining elements of the framework to assure stable attachment of the carrier to the bale. The carrier is applied to the bale while inverted, following which the bale and carrier are righted. The bale wires are manipulated and the bale with the attached carrier is propelled by a conventional bale hook.

13 Claims, 8 Drawing Figures

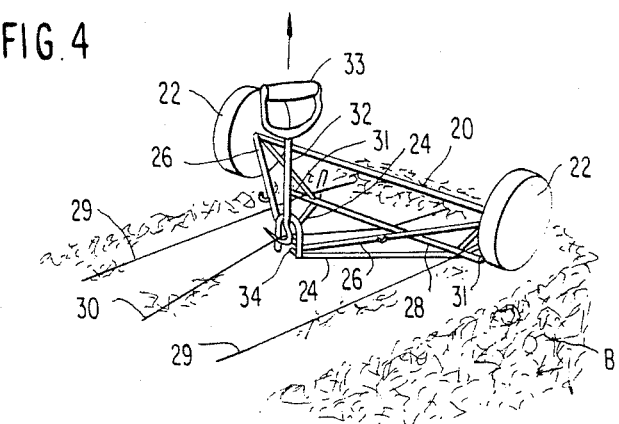
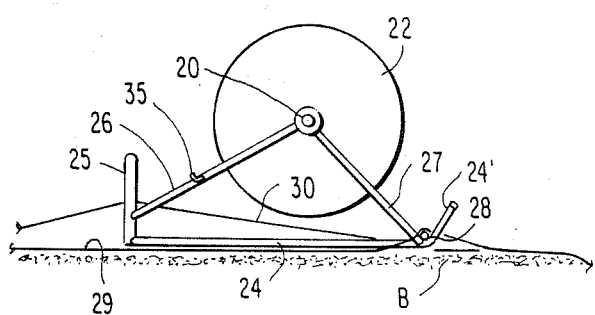
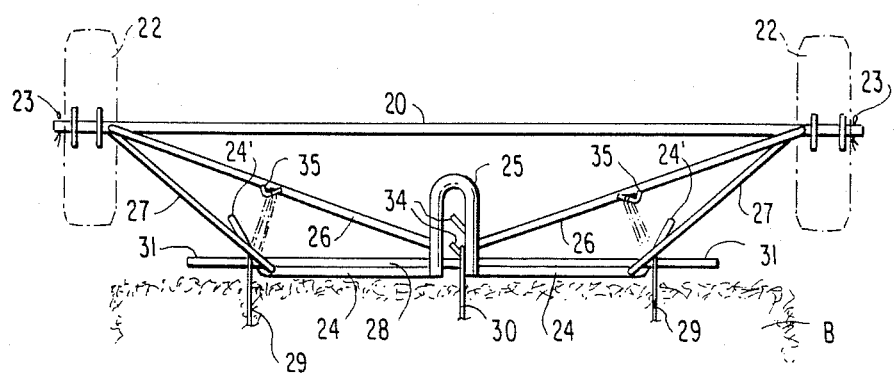
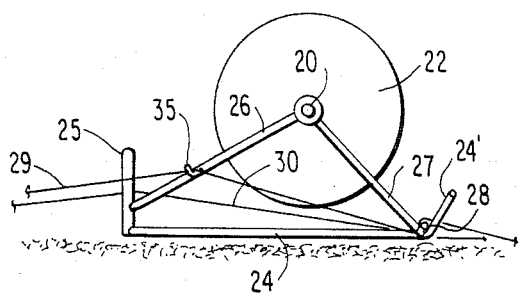
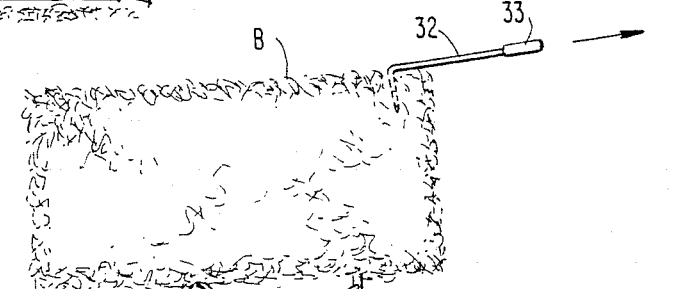

HAY BALE CARRIER

BACKGROUND OF THE INVENTION

Show horses and prize cattle at fairs are frequently stationed inconvenient distances from sources of hay, as a result of which the attendants of these horses or cattle must transport hay bales from a fairly remote storage location to the animal's stall for food and/or bedding. This activity has given rise to the need for a simple, economical and convenient transport device for a bale of hay at horse shows, county fairs and at similar activities.

Devices are known in the prior art for this general purpose and one example is disclosed in U.S. Pat. No. 4,174,849. Generally speaking, known prior art devices for this purpose have not been widely adopted because their cost, complexity of construction and operation, and their degree of convenience of usage have not been such as to appeal to purchasers in the marketplace.

Accordingly, the object of this invention is to provide a hay bale carrier of such convenience, economy and simplicity as to appeal readily to all potential purchasers who have a need for this type of transport device. More particularly, it is an object of the invention to improve on the known prior art, particularly in terms of practicality and ease or convenience of use.

Other objects and advantages of the invention will become apparent to those skilled in the art during the course of the following description.

BRIEF DESCRIPTION OF THE DRAWINGS

FIG. 4 is a further fragmentary perspective view showing a further step in the attachment of the carrier to a bale with the assistance of a bale hook.

FIG. 5 is a side elevational view of the carrier and bale following the attachment step shown in FIG. 4.

FIG. 6 is a front elevational view of the carrier and bale showing the engagement of two outside bale wires with two retainer elements on the carrier framework.

FIG. 7 is a side elevational view of the carrier as depicted in FIG. 6.

FIG. 8 is a side elevation of the bale, carrier and bale hook in their transport positions.

DETAILED DESCRIPTION

Figure 1:
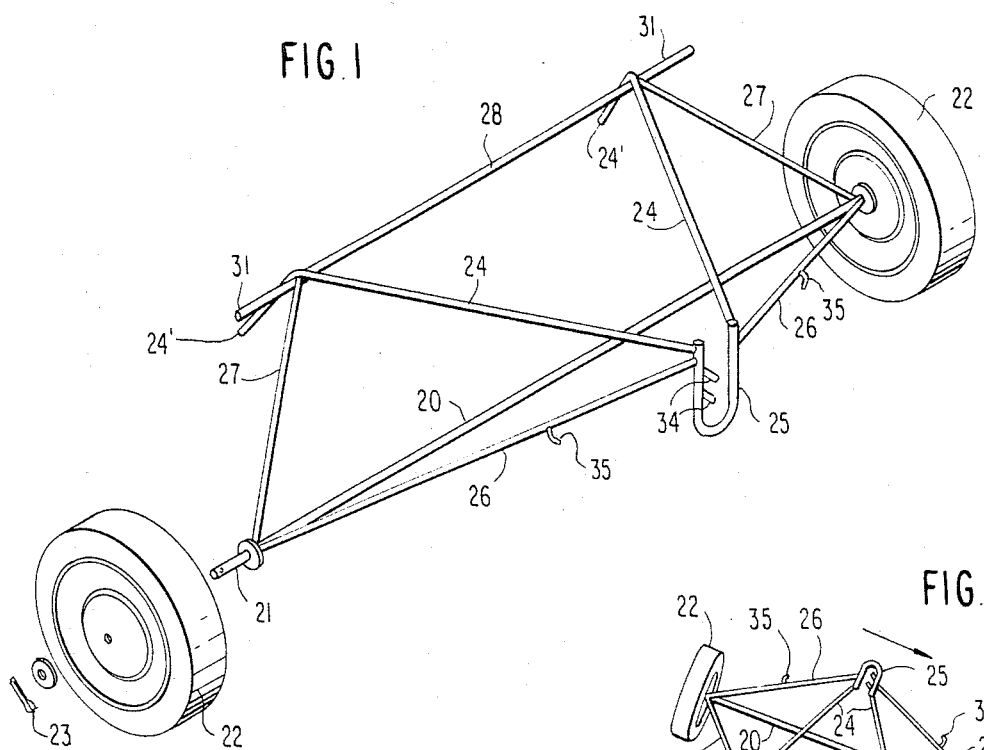
FIG. 1 is a partly exploded perspective view of a hay bale carrier in its transport position.

Referring to the drawings in detail, wherein like numerals designate like parts throughout the same, a hay bale barrier according to a preferred embodiment of the invention comprises a transverse axle rod 20 having opposite end axle extensions 21 on which two suitable wheels 22 are freely rotatably mounted and retained by conventional means 23. In a level plane spaced above the axle member 20, two forwardly convergent rods 24 have their forward ends fixed to a U-member 25 which depends from the rods 24 at right angles thereto. Forward inclined brace rods 26 have their forward ends fixed to opposite sides of the U-member 24 near and below the rods 24 and their rear ends similarly fixed to the axle member or rod 20 near and inwardly of the wheels 22.

Rear inclined brace rods 27 have their forward ends fixed to the axle rod 20 substantially opposite the rods 26 and have their rear ends fixed to a transverse attaching rod 28 which is parallel to the axle rod 20 and spaced above and rearwardly thereof. The attaching rod 28 lies immediately under the converging rods 24 near their rear ends, which rods define a plane adapted to abut one surface of a common rectangular hay bale B having the customary three spaced parallel bale wires 29 and 30. Equal length end portions 31 of the attaching rod 28 project laterally outwardly of the attachment points with the rods 24 and 27. Equal length end extensions 24' of the rods 24, which are approximately the same lengths as the end portions 31, extend rearwardly at an angle to the rods 24, at approximately 45°, and laterally outwardly therefrom, beyond rod 28 and away from the level plane of rods 24 and toward the plane of axle rod 20. The attaching rod 28 is thus connected to the bight portions or rods 24. The rod framework of the bale carrier thus formed is strong, light-weight, unitary and simplified. As will be fully described, the wheeled bale carrier is employed in conjunction with a common bale hook 32 having a handle 33.

Figure 2:
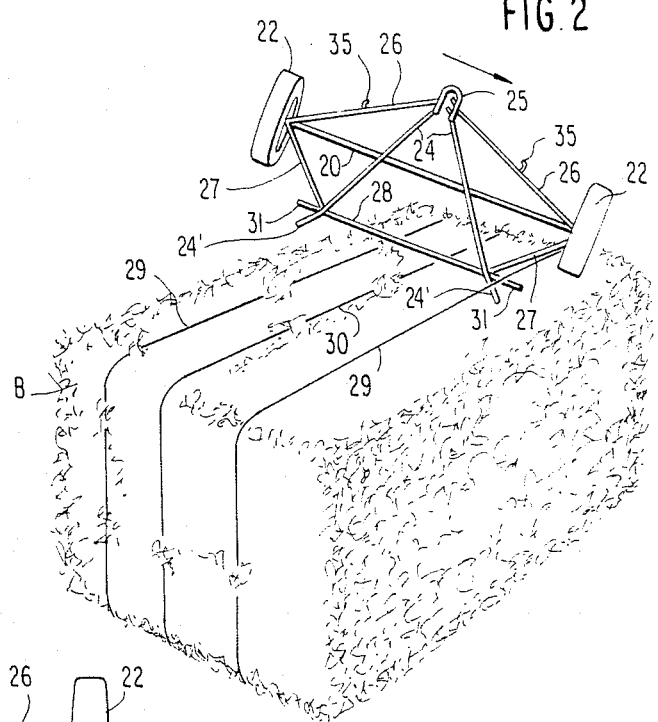
FIG. 2 is a perspective view of the carrier in an inverted installation position relative to a hay bale and depicting the first step in the attachment of the carrier to the bale.
Figure 3:
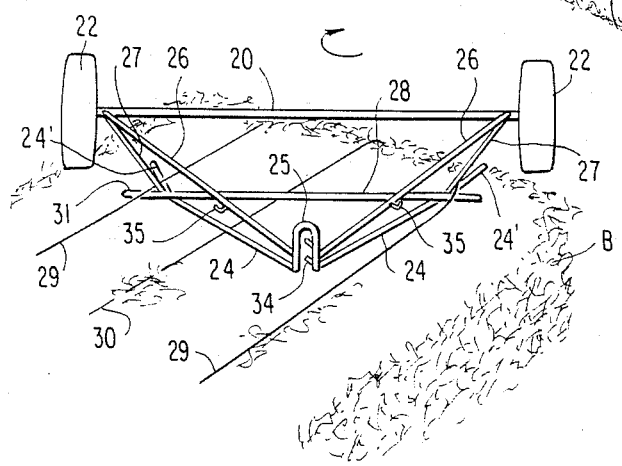
FIG. 3 is a similar view showing a second step in the attachment of the carrier to a hale bale.

In use, the carrier is inverted from its transport position shown in FIGS. 1 and 8 and placed, wheels up, on one longitudinal surface of the bale transversed by the wires 29 and 30. The two convergent rods 24 which define the mounting plane for the carrier engage the flat face of the bale. As shown in FIG. 2, the carrier can be tilted to allow engagement of one end portion 31 of attaching rod 28 and the adjacent end extension 24' under one outside bale wire 29. The carrier is then swung horizontally as in FIG. 3 while the other rod end portion 31 and the adjacent end extension 24' is slid beneath the other outside bale wire 29. In this latter step, it may be necessary to lift the other outside bale wire 29 up over the last mentioned end extension 24'. Following this, the carrier is again centered with respect to the bale, as shown in FIG. 4. The bale hook 32 is now employed to lift the center bale wire 30 and engage it with one of several retainer pins 34 provided on one side of the U-member 25. Following such engagement, the center wire 30 will be taut and will pull the carrier firmly against the opposing surface of the bale.

In situations where the outside wires 29 are taut, it is unnecessary to do anything further in attaching the carrier to the bale B and the carrier will be adequately secured to the bale by the end portions 31, end extensions 24' and retainer pin 34. However, if the outside wires 29 are still somewhat loose, the bale hook 32 is again employed to pull these wires upwardly and inwardly toward the center of the bale and carrier and engage them with retaining hooks 35 carried by the braces 26 intermediate the ends of such braces. The directing of the outside wires 29 toward the center of the carrier tends to tightly wedge the wires 29 between the end portions 31 of attaching rod 28 and the inclined braces 27 as best shown in FIG. 6. The end extensions 24' also perform this same function.

An additional attribute of the invention shown in FIGS. 5 and 7 comprises the temporary crimping or deformation of the outside bale wires 29 where the latter pass over the transverse attaching rod 28. The angled end extensions 24' prevent the outside wires from moving apart and maintain them wedged in crimp like fashion between inclined braces 27 and the end portions 31 thus preventing the carrier sliding rearward on the bale but still not causing damage to the bale wires. This crimping is even more pronounced, FIG. 7, when the outside wires 29 are engaged with the retainer hooks 35. In either case, the taut outside wires 29 acting on the transverse attaching rod 28 while the center wire 30 is acting on one of the pins 34 results in a tight bonding of the top of the carrier to the bale B. The described crimping of the two wires 29 does not break or damage them or otherwise interfere with their normal functioning.

Following the simple procedure above described for attaching the carrier to the bale B, the now-united bale and carrier are flipped over or righted so that the carrier supports the bale wheels down, as shown in FIG. 8. The bale hook 32 is now impaled in the top of the bale and handle 33 of the bale hook is grasped to manually propel the bale on the carrier to its required point of usage. At this destination, the bale is flipped over onto its back, thus returning the carrier to its position shown in FIGS. 4 to 7, and the bale hook 32 is again used to release the bale wires, following which the carrier as a unit is easily separated from the bale and set aside until it is again needed.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A carrier for a hay bale or the like comprising a wheeled axle member, a framework secured to the axle member and including at least a pair of frame members spaced above the axle member and defining an abutment plane for the carrier with a surface of a bale and a transverse attaching member spaced above and rearwardly of the axle member and substantially parallel therewith and near said abutment plane, bale wire retainer means on the carrier near the forward end thereof and away from the attaching member and somewhat below said plane and above said axle member, and said attaching member including two bale wire engaging end portions projecting laterally outwardly of said pair of frame members.

2. A carrier for a hay bale or the like as defined in claim 1, and said framework further including pairs of forward and rear inclined braces connected respectively between said axle member and bale wire retainer means and axle member and transverse attaching member.

3. A carrier for a hay bale or the like as defined in claim 1, and said bale wire retainer means comprising a depending member fixed to the forward ends of said pair of frame members and having vertically spaced bale wire retainer elements thereon.

4. A carrier for a hay bale or the like as defined in claim 2, and spaced selective bale wire retainer elements on said bale wire retainer means, and at least an additional pair of bale wire retainer elements on the forward inclined braces of the carrier substantially below said abutment plane.

5. A carrier for a hay bale or the like as defined in claim 4, and a bale hook separate from the carrier adapted to be engaged in a bale on the carrier for propelling the bale and carrier.

6. A carrier for a hay bale or the like as defined in claim 1, including a hay bale in combination therewith, said hay bale having hay bale wires, and a bale hook separate from the carrier and engageable with the bale wires to manipulate them into engagement with said bale wire retainer means, and engageable in the bale to facilitate moving the bale and carrier to a destination.

7. A carrier for a hay bale or the like as defined in claim 3, and said depending member comprising a U-member having sides fixed to the forward ends of said pair of frame members.

8. A carrier for a hay bale or the like as defined in claim 1, and said pair of frame members each including an end extension projecting somewhat laterally outward therefrom and rearward of said attaching member at an angle away from said abutment plane, whereby such end extensions can be releasably engaged beneath bale wires.

9. A carrier for a hay bale comprising a wheeled frame including an axle member and elevated frame members spaced above the axle member, pairs of forward and rear inclined braces uniting the axle member with the elevated frame members, the elevated frame members comprising a pair of forwardly convergent frame members and occupying substantially a common plane, whereby they can substantially abut a flat surface of a bale, a transverse attaching member spaced above and rearwardly of and substantially parallel to the axle member and being united to said convergent frame members and said rear braces, and retainer elements on the carrier at its forward and rear ends including a pair of such elements in laterally spaced relationship near said common plane and extending outwardly of the elevated frame members, said pair of retainer elements comprising end terminals of the transverse attaching member which project laterally outwardly of the forwardly convergent frame members, and at least one such retainer element near the center of the carrier and somewhat below the elevation of said common plane.

10. A carrier for a hay bale as defined in claim 9, and said axle member and elevated frame members consisting of rods.

11. A carrier for a hay bale as defined in claim 9, and said axle member being supported by a pair of wheels on its opposite end portions near opposite sides of said frame.

12. A carrier for a hay bale as defined in claim 9, and said pair of retainer elements additionally including rear end terminals of the fowardly convergent frame members which project angularly rearwardly away from the common plane and said transverse attaching member, and laterally outwardly at an angle to said pair of end terminal retainer elements of the transverse attaching member.

13. A carrier for a hay bale comprising a wheeled frame including an axle member and elevated frame members spaced above the axle member, pairs of forward and rear inclined braces uniting the axle member with the elevated frame members, the elevated frame members comprising a pair of forwardly convergent frame members and occupying substantially a common plane, whereby they can substantially abut a flat surface of a bale, and retainer elements on the carrier at its forward and rear ends including a pair of such elements in laterally spaced relationship near said common plane and extending outwardly of the elevated frame members, said pair of retainer elements comprising rear end terminals of the forwardly convergent frame members which project angularly rearwardly away from the common plane and laterally outwardly at an angle to the common plane, and at least one such retainer element near the center of the carrier and somewhat below the elevation of said common plane.

* * * * *